US008171033B2

(12) United States Patent
Marvasti

(10) Patent No.: US 8,171,033 B2
(45) Date of Patent: May 1, 2012

(54) METHODS AND SYSTEMS FOR THE DETERMINATION OF THRESHOLDS VIA WEIGHTED QUANTILE ANALYSIS

(75) Inventor: Mazda A. Marvasti, Rancho Santa Margarita, CA (US)

(73) Assignee: VMware, Inc., Palo Alto, CA (US)

(*) Notice: Subject to any disclaimer, the term of this patent is extended or adjusted under 35 U.S.C. 154(b) by 539 days.

(21) Appl. No.: 12/241,631

(22) Filed: Sep. 30, 2008

(65) Prior Publication Data
US 2010/0082638 A1   Apr. 1, 2010

(51) Int. Cl.
*G06F 7/00* (2006.01)
*G06F 17/30* (2006.01)

(52) U.S. Cl. ........ 707/748; 707/758; 707/776; 702/160; 702/176; 702/179

(58) Field of Classification Search .................. 707/748, 707/758, 776; 702/176, 179, 180, 160
See application file for complete search history.

(56) References Cited

U.S. PATENT DOCUMENTS

| | | | |
|---|---|---|---|
| 7,103,562 B2 * | 9/2006 | Kosiba et al. | 705/10 |
| 7,483,811 B2 * | 1/2009 | Whisnant et al. | 702/179 |
| 7,620,523 B2 * | 11/2009 | Marvasti et al. | 702/183 |
| 7,711,734 B2 * | 5/2010 | Leonard | 707/754 |
| 7,752,301 B1 * | 7/2010 | Maiocco et al. | 709/224 |
| 7,809,737 B2 * | 10/2010 | Taira et al. | 707/758 |
| 2003/0101009 A1 * | 5/2003 | Seem | 702/61 |
| 2004/0162742 A1 * | 8/2004 | Stoker et al. | 705/7 |
| 2004/0186803 A1 * | 9/2004 | Weber et al. | 705/35 |
| 2005/0256759 A1 * | 11/2005 | Acharya et al. | 705/10 |
| 2006/0276995 A1 * | 12/2006 | Breitgand et al. | 702/179 |
| 2007/0189213 A1 * | 8/2007 | Karino et al. | 370/328 |
| 2007/0191688 A1 * | 8/2007 | Lynn | 702/19 |
| 2008/0168004 A1 * | 7/2008 | Kagarlis et al. | 702/181 |
| 2009/0006460 A1 * | 1/2009 | Kleinberg et al. | 707/102 |
| 2010/0063773 A1 * | 3/2010 | Marvasti et al. | 702/179 |
| 2010/0229096 A1 * | 9/2010 | Maiocco et al. | 715/734 |

OTHER PUBLICATIONS

Loughran et al. "The Impact of Venture Capital Investments on Industry Performance"—Mendoza Colledge of Business, University of Norttr Dame, May 27, 2008 (pp. 1-37).*
Tang et al.—Rhythm Modeling Visualizations and Applications"—Proceeding UIST'03—Proceeedings of the 16th annual ACM Symposium on User Interface software and Technology" 2003 ACM, vol. 5, Issue2 (pp. 11-20:1-10).*

* cited by examiner

*Primary Examiner* — John E Breene
*Assistant Examiner* — Anh Ly

(57) ABSTRACT

Methods and systems for determination of thresholds for time-series data. Data is transformed by reducing outliers, dividing the time series data into discrete time intervals, and taking parts of the data corresponding to the range that the thresholds will bound. If data cycles are known, they may be applied to the data and the resulting sets are weighted. Thresholds are then derived from the weighted means and variances of the sets of weighted data.

7 Claims, 3 Drawing Sheets

METHODS AND SYSTEMS FOR THE DETERMINATION OF THRESHOLDS VIA WEIGHTED QUANTILE ANALYSIS

BACKGROUND

This disclosure relates to the determination of dynamic thresholds for time-series data.

SUMMARY

Methods and systems for determination of thresholds for time-series data. Data is transformed by reducing outliers, dividing the time series data into discrete time intervals, and taking parts of the data corresponding to the range that the thresholds will bound. If data cycles are known, they may be applied to the data and the resulting sets are weighted. Thresholds are then derived from the weighted means and variances of the sets of weighted data.

According to a feature of the present disclosure, a method is disclosed comprising dividing a set of time-series data into at least one time period, creating at least one set of ranged time-series data by selecting data points from each time period corresponding to a percentage of values useful in defining a threshold, applying cycles to the set of ranged time-series data, applying weights to the data for each cycle of ranged time-series data, and determining at least one threshold from the weighted time-series data.

According to a feature of the present disclosure, a method is disclosed comprising providing a system for determination of dynamic thresholds, wherein the system determines dynamic thresholds by dividing a set of time-series data into at least one time period, creating at least one set of ranged time-series data by selecting data points from each time period corresponding to a percentage of values useful in defining a threshold, applying cycles to the set of ranged time-series data, applying weights to the data for each cycle of ranged time-series data, and determining at least one threshold from the weighted time-series data.

According to a feature of the present disclosure, a machine-readable medium is disclosed having program instructions stored thereon executable by a processing unit for performing the steps of dividing a set of time-series data into at least one time period, creating at least one set of ranged time-series data by selecting data points from each time period corresponding to a percentage of values useful in defining a threshold, applying cycles to the set of ranged time-series data, applying weights to the data for each cycle of ranged time-series data, and determining at least one threshold from the weighted time-series data.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
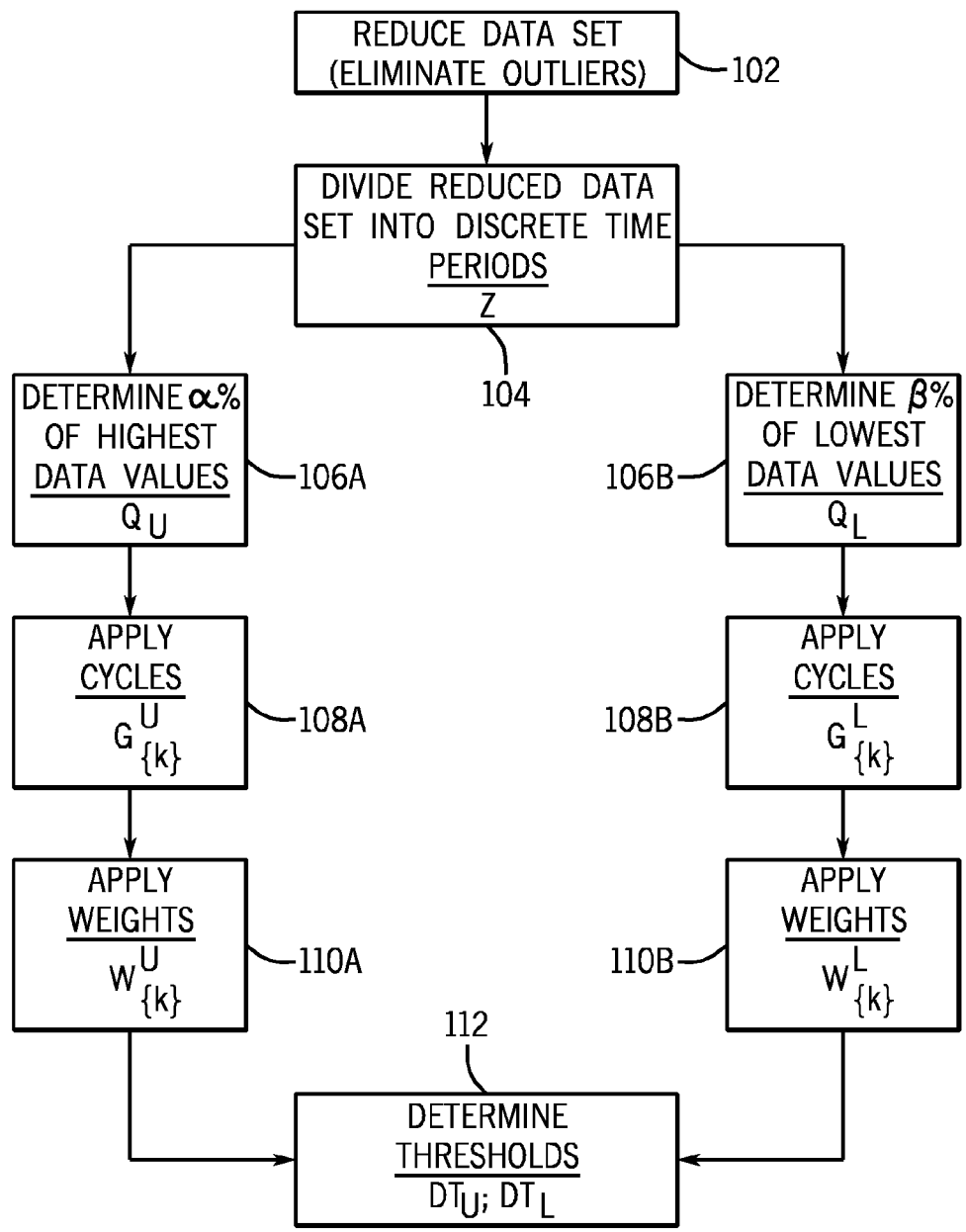
FIG. 1 is a flow diagram of an embodiment of a method for determining dynamic thresholds.

In the following detailed description of embodiments of the present disclosure, reference is made to the accompanying drawings in which like references indicate similar elements, and in which is shown by way of illustration specific embodiments in which the present disclosure may be practiced. These embodiments are described in sufficient detail to enable those skilled in the art to practice the present disclosure, and it is to be understood that other embodiments may be utilized and that logical, mechanical, biological, electrical, functional, and other changes may be made without departing from the scope of the present disclosure. The following detailed description is, therefore, not to be taken in a limiting sense, and the scope of the present disclosure is defined only by the appended claims. As used in the present disclosure, the term "or" shall be understood to be defined as a logical disjunction and shall not indicate an exclusive disjunction unless expressly indicated as such or notated as "xor."

The present disclosure incorporates by reference U.S. patent application Ser. Nos. 12/186,494, filed 5 Aug. 2008, entitled "Methods for the Cyclical Pattern Determination of Time-Series Data Using a Clustering Approach," and 12/186,496, filed 5 Aug. 2008, entitled "Methods for the Cyclical Pattern Determination of Time-Series Data Using a Clustering Approach." Methods and systems for determining cycles are disclosed therein.

The inventors discovered novel methods and systems for determining cycles from time-series data irrespective of the expected variations that occur in sets of time-series data. According to the methods and systems, cycles of similar data are accounted for in determining appropriate thresholds and predicative models for the source of the data, and for other purposes as would be known and understood to a person of ordinary skill in the art.

Generally, the methods and systems for determining thresholds comprises selecting a set of data corresponding to a desired behavioral aspect of the time-series data to create an about normal distribution of the data. To get the about normal distribution of the data, the data is first divided into time periods and data corresponding to the desired behavioral aspect is taken from each time period. Using the about normal distribution of the data, thresholds are determined based on statistical analysis of the resulting set of data representing the desired behavioral aspects, as described in greater detail hereafter.

In performing dynamic threshold (DT) analysis on time-series data, a weight system is employed to provide more emphasis on current data. The weight system is useful for faster convergence of the thresholds as changes takes place. In other words, weighting the data used to determine the thresholds allows for evolution of changes within the patterns of the data to be represented in the thresholds more rapidly, which allows for greater confidence when the thresholds are set to be sensitive.

DEFINITIONS

According to embodiments, the following operators are defined:

$\hat{Q}_\alpha^U$=Quantile operator that provides the $\alpha$ fraction of highest values of the applied data set.

$\hat{Q}_\beta^L$=Quantile operator that provides the $\beta$ fraction of lowest values of the applied data set.

$\hat{R}$=Data reduction operator that removes outliers. For example, $\hat{R}_a$ may be defined to eliminate the 'a/2' fraction of the highest and lowest values of the data set to which it is applied.

$\hat{C}_{\{k\}}$=Cyclical pattern operator that provides data only relevant to the specified cycle. The subscript set refers to the appropriate indexing for the cycles of interest.

$\hat{D}$=Time period operator that divides the data set into time period. Artisans will readily observe that $\hat{D}$ is special case of the $\hat{C}_{\{k\}}$ operator and is applied for a difference purpose than $\hat{C}_{\{k\}}$ as disclosed herein.

$\hat{W}_\gamma$=Weight operator which will apply an appropriate weight to each element of the applied set based on a prespecified function. Artisans will recognize that the prespecified weighting function may be any function that weights the data in a useful way. Stated another way, the prespecified weighting function may be $g_i \equiv f(\gamma, i)$ $i=1, 2, \ldots, N$, where $\gamma$ is a constant.

As used herein, the term quantile shall be defined as a general name for the values of a variable that divide its distribution into equal groups.

Time-Series Data Transformation and Selection

According to embodiments, and as shown in FIG. 1, a method is disclosed for determination of dynamic thresholds for a set of time-series data (X). For example, let $\chi_j$ represent raw data points for a given time period for $j=1, \ldots, m$ data points spanning that time period. According to embodiments, time periods are days. According to alternate embodiments, time periods are weeks, months, or years. Then:

$$\chi_j \equiv \{x_1, x_2, \ldots, x_m\}$$

$$X \equiv \{\chi_1, \chi_2, \ldots, \chi_N\} = \bigcup_{j=1}^{N} \chi_j$$

where X is the entire time-series data.

A person of ordinary skill in the art will understand how to select the time periods. For example, if the time series data comprises five years worth of data, weeks may be an appropriate time period. However, if 120 days of data are present, then days may be an appropriate time period.

According to embodiments, the time-series data set is first reduced in operation 102, that is outliers are removed from the set. Reduction is an optional step, depending on the type of data and the importance of the outliers in the interpretation of the data.

In operation 104, the data set is divided into discrete time periods to form set Z. Using the functions defined previously and including a reduction step (operation 102 of FIG. 1), set Z is defined as the union of a plurality of sets of reduced real time data for each time period. Stated another way:

$$Z = \{z_i\}_{i=1}^{m} = \hat{D}\hat{R}X$$

wherein m is the number of time periods into which set $\hat{R}X$ is divided.

Following division of the time-series data into time periods, for each time period of time-series data, a subset of that data is selected to be used for the purposes of calculating the dynamic thresholds in operation 106. According to embodiments, data will be categorized into quantiles by value for determination of an upper threshold and a lower threshold. According to embodiments, other methods for dividing data are useful depending on the number of thresholds being determined and the nature of the data.

According to embodiments, the appropriate quantile will be used for computing the upper and lower dynamic thresholds. The quantiles are determined on a time period basis and the union of all time period quantiles constitute the quantile set. Dividing the data into time periods prior to gathering the quantile data prevents bad data from one time period from dominating the quantile information.

According to embodiments, the time-series data is transformed into at least one set of ranged time-series data, one for each threshold desired. Each set of ranged time-series data corresponds to a percentage of values useful in defining that threshold. For example, if an upper threshold is desired, the highest 10% of values for each time period will be aggregated into the ranged time-series data set for the upper threshold. For example, if a lower threshold is desired, all data points representing the lowest 15% of the given range will be aggregated into the data set. A similar approach if a threshold representing the median value of the time-series data is desired, etc. The specific percentage that is chosen for any given threshold represents a quantile.

For example and as shown in FIG. 1, if an upper and a lower dynamic threshold are desired, the values of the data points corresponding to the highest $\alpha\%$ (operation 106a) and lowest $\beta\%$ (operation 106b) of the data for each time period is selected and aggregated into the respective ranged time-series data sets for the upper and lower thresholds. Artisans will readily note that the highest $\alpha\%$ and lowest $\beta\%$ correspond to two dynamic thresholds: a high threshold and a low threshold. If only one threshold were needed, for example a high threshold, on the top $\alpha\%$ would be needed. Similarly, if a threshold representing median values were required, the middle $\gamma\%$ might be used to show when a trend was above or below average. Artisans will readily appreciate and understand which sets of data to use for the purposes of determining the desired thresholds.

The resulting $\alpha\%$ and $\beta\%$ of data for each time period is combined with all the other selected $\alpha\%$ and $\beta\%$ respectively to create two ranged time-series data sets having the highest $\alpha\%$ and lowest $\beta\%$ of the data over the entire set of time-series data. The ranged time-series data sets for the highest $\alpha\%$ and lowest $\beta\%$ are represented as $Q_U$ for the upper $\alpha\%$ and $Q_L$ for the lower $\beta\%$. Because the highest $\alpha\%$ and lowest $\beta\%$ are collected on a per time period basis rather than over the entire set X of data, the resulting sets of selected data are assumed to have about normal distribution.

Figure 2:
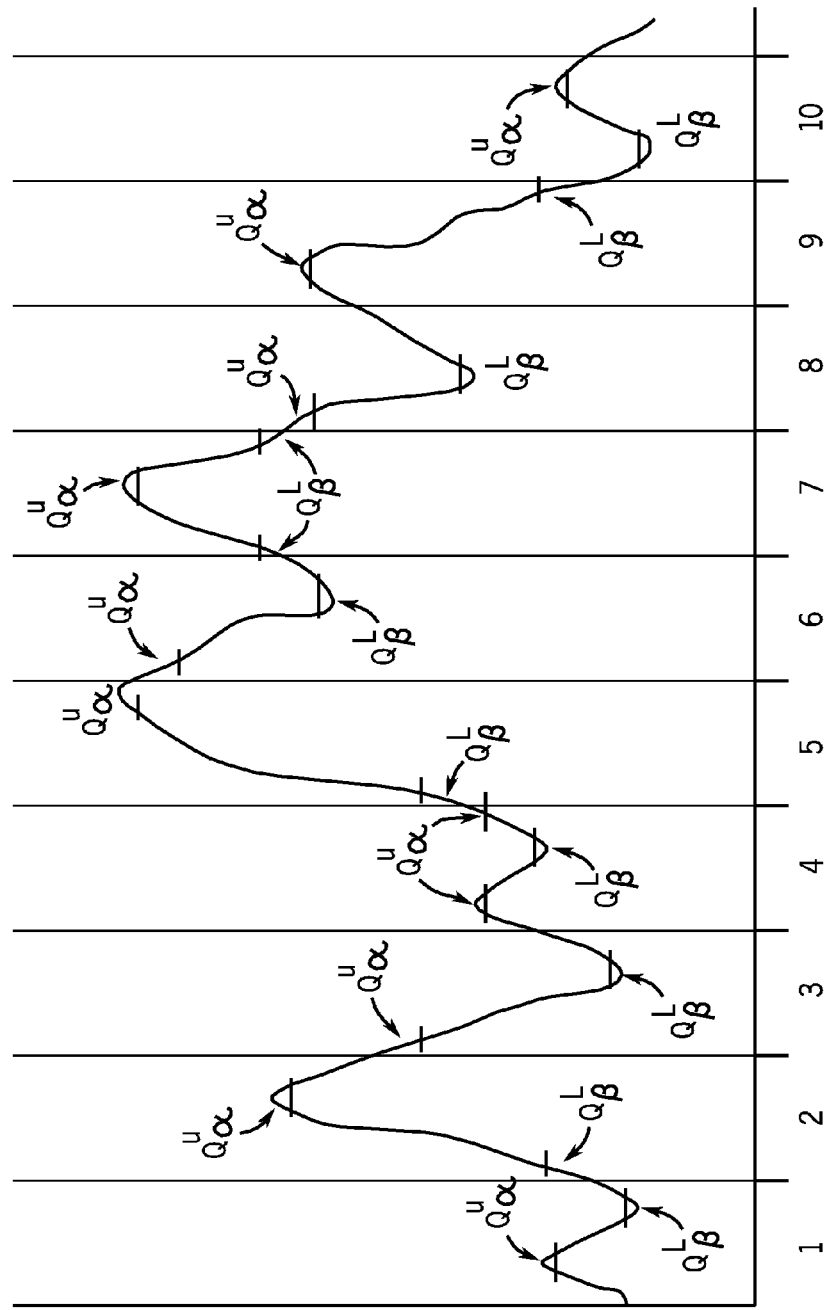
FIG. 2 is a graph of exemplary data showing an embodiment of selecting upper and lower valued data to be weighted and used for the determination of dynamic thresholds.

FIG. 2 illustrates the representation of time-series data divided into time series data (operation 104 of FIG. 1). In FIG. 2, ten time periods (1-10) are shown along the X-axis of the graph. Real time data X is plotted and that data is converted into time periods (set Z) by applying the $\hat{D}$ operation. Resultantly, a set Z of ten time periods of data is shown, each time period of data having the corresponded raw data for that time period.

In time period one, the highest peak corresponds to a value of 26; the lowest peak corresponds to a value of 14. Compare time period one to time period seven, where the highest peak corresponds to a value of 77 and the lowest values correspond to values of 57 and 56 (because there is no peak for the lowest values). Assume, for example, that $\alpha=10$ and $\beta=10$. Thus, for each time period, the upper 10% of values would be taken and the lower 10% of values would be taken to determine sets $Q_U$ and $Q_L$.

Table 1 summarizes the values that would be taken for each of the highest and lowest sets. Assume that for each discrete time period, 50 measurements are taken. If $\alpha=10$ and $\beta=10$, then for each time period the highest five (50 measurements*10%) values are taken and the lowest five values are taken. Note that this data has outliers removed.

TABLE 1

| Time Period | Highest Value (H) | Lowest Value (L) | Upper 10% | Lower 10% |
| --- | --- | --- | --- | --- |
| 1 | 26 | 14 | 24, 24, 25, 25, 26 | 14, 14, 15, 15, 16 |
| 2 | 58 | 20 | 56, 56, 57, 57, 58 | 20, 21, 22, 23, 24 |

TABLE 1-continued

| Time Period | Highest Value (H) | Lowest Value (L) | Upper 10% | Lower 10% |
|---|---|---|---|---|
| 3 | 45 | 16 | 41, 42, 43, 44, 45 | 15, 16, 17, 17, 18 |
| 4 | 35 | 25 | 33, 33, 34, 34, 35 | 25, 26, 26, 27, 27 |
| 5 | 78 | 35 | 75, 76, 77, 77, 78 | 35, 36, 37, 38, 39 |
| 6 | 75 | 52 | 71, 72, 73, 74, 75 | 52, 53, 53, 53, 53 |
| 7 | 78 | 57 | 76, 76, 77, 77, 78 | 57, 57, 58, 58, 58 |
| 8 | 57 | 33 | 55, 55, 56, 56, 57 | 33, 34, 34, 34, 35 |
| 9 | 55 | 17 | 53, 53, 54, 54, 55 | 17, 19, 20, 21, 23 |
| 10 | 23 | 13 | 21, 22, 22, 22, 23 | 13, 13, 14, 14, 14 |

$Q_U$ and $Q_L$ represent the union of all the upper and lower values for all time periods. $Q_U$ and $Q_L$ comprise ranged time-series data sets. Stated alternatively:

$$Q_U = \bigcup_{i=1}^{m} \hat{Q}_\alpha^U Z \text{ and } Q_L = \bigcup_{i=1}^{m} \hat{Q}_\beta^L Z.$$

Thus, $Q_U$={21, 22, 22, 22, 23, 24, 24, 25, 25, 26, 33, 33, 34, 34, 35, 41, 42, 43, 44, 45, 53, 53, 54, 54, 55, 55, 55, 56, 56, 56, 56, 57, 57, 57, 57, 71, 72, 73, 74, 75, 75, 76, 76, 76, 77, 77, 77, 77, 78, 78}. $Q_L$={13, 13, 14, 14, 14, 14, 14, 15, 15, 15, 16, 16, 17, 17, 17, 18, 19, 20, 20, 21, 21, 22, 23, 23, 24, 25, 26, 26, 27, 27, 33, 34, 34, 34, 35, 35, 36, 37, 38, 39, 52, 53, 53, 53, 53, 57, 57, 58, 58, 58}.

Artisans will readily note that the actual time-series data is not constrained to any pattern. Rather, because only the α% highest values and β% lowest values are taken, the data is assumed to be normal given a large enough sample. When cycles are applied, the ranged time-series data sets are assumed to be more normal despite the smaller set size because cycles account for variations in the data, thereby grouping values of similar data together.

Turning again to exemplary embodiment of FIG. 1, after the $Q_U$ and $Q_L$ are determined in operations 106A and 106B, predetermined cycles are applied to $Q_U$ and $Q_L$ in operations 108A and 108B. Stated alternatively, $$G_{\{k\}}^U = \hat{C}_{\{k\}} Q_U \text{ and } G_{\{k\}}^L = \hat{C}_{\{k\}} Q_L.$$

In other words, the cycle operator of a given cycle k is applied to each $Q_U$ and $Q_L$ to populate cycle sets $G_{\{k\}}^U$ and $G_{\{k\}}^L$ for each cycle.

For example, an hourly cycle on a weekly basis is defined as $\hat{H}_{i,j}$ which represents the operator for obtain data for hour i and day j. (Note that in this case {k} in $\hat{C}_{\{k\}}$ is i, j). Then substituting for $\hat{C}_{\{k\}}$ in the above analysis with $\hat{H}_{i,j}$ the data sets $W_{i,j}^U$ and $W_{i,j}^L$ are obtained which will then be analyzed to obtain the upper and lower dynamic thresholds.

By applying cycles, the data contained in $Q_U$ and $Q_L$ are aggregated into groups of like data. For example, turning again to FIG. 2, assume that time periods 5, 6, 7 belong to cycle 1, time periods 1, 4, and 10 belong to cycle 2, time period 2 belongs to cycle 3, and time period 8 and 9 belong to cycle 4. Thus:

$G_{\{1\}}^U$={71, 72, 73, 74, 75, 75, 76, 76, 76, 77, 77, 77, 77, 78, 78};
$G_{\{2\}}^U$={21, 22, 22, 22, 23, 24, 24, 25, 25, 26, 33, 33, 34, 34, 35};
$G_{\{3\}}^U$={56, 56, 57, 57, 58};
$G_{\{4\}}^U$={53, 53, 54, 54, 55, 55, 55, 56, 56, 57};
$G_{\{1\}}^L$={35, 36, 37, 38, 39, 52, 53, 53, 53, 53, 57, 57, 58, 58, 58};
$G_{\{2\}}^L$={13, 13, 14, 14, 14, 14, 14, 15, 15, 16, 25, 26, 26, 27, 27};
$G_{\{3\}}^L$={20, 21, 22, 23, 24}; and
$G_{\{4\}}^L$={17, 19, 20, 21, 23, 33, 34, 34, 34, 35}.

In operations 110A and 110B of FIG. 1, weights are applied to each $G_{\{k\}}^U$ and $G_{\{k\}}^L$ data set in the exemplary embodiment. Weighting the values in the data set results in the more recent data having a higher weight than less recent data. Weighting is accomplished by attributing a prespecified function to each $G_{\{k\}}^U$ and $G_{\{k\}}^L$ data set. Expressed alternatively:

$$W_{\{k\}}^U = \hat{W}_\gamma G_{\{k\}}^U \text{ and } W_{\{k\}}^L = \hat{W}_\gamma G_{\{k\}}^L.$$

For example, the function:

$$g_i = \gamma^{ln(i)} \, i = 1, 2, \ldots, N \text{ and } \gamma \geq 1$$

may be applied as the weighting function, where γ is some constant and i is the index number of each member of the data set, where 1 is the oldest data point and N is the most recent data point. Adjustment of the γ constant allows for the sensitivity of the weighting to be adjusted. If too much weight is being applied, γ may be reduced, according to embodiments. The above function weights the data in a exponential manner; weighting need not be exponential, but may be linear or any other curve type that accounts for the particular data. According to embodiments, exponential weighting is useful inasmuch as it provides a method of giving more recent data more weight than less recent data.

Determination of Thresholds

Figure 3:
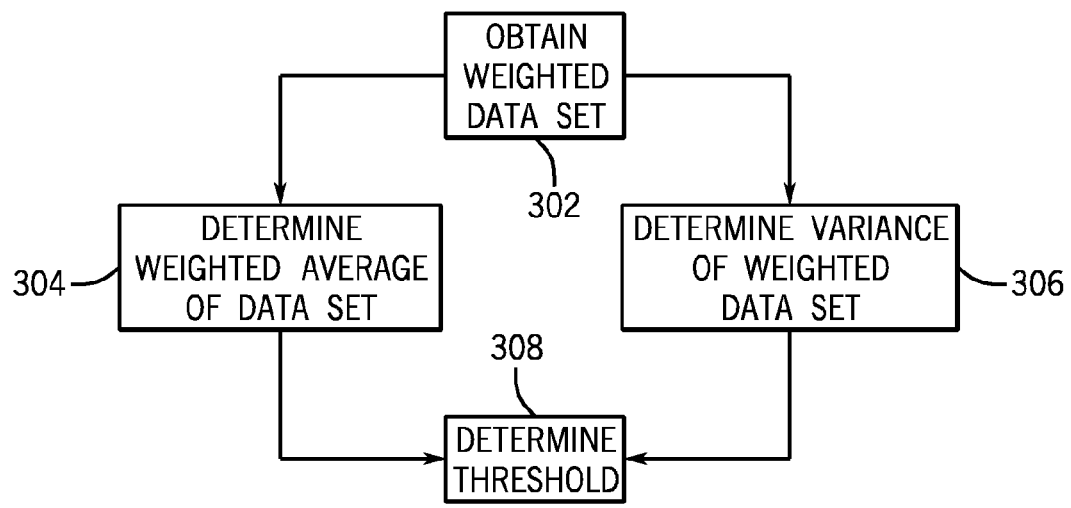
FIG. 3 is a flow diagram of an embodiment of a method for determining dynamic thresholds.

According to embodiments, thresholds are determined from the sets of weighted sets of data. FIG. 3 illustrates an exemplary method for determining thresholds. If the cycle operator has been used, each threshold may be used for the given cycle. According to embodiments, a weighted data set is obtained in operation 302. A weighted average is determined in operation 304 and a weighted variance is determined in operation 306. From these data, the threshold is determined in operation 308.

According to the exemplary embodiment illustrated above, determination of thresholds is performed for both upper and lower thresholds. However, generally, any number of thresholds may be determined by adapting the principles disclosed herein for one, two, or more thresholds depending on the relevant criteria on a case-by-case basis.

The process for determining the thresholds is performed for each threshold desired. In general, given a data set Y and a weight function $g_i$, then the weighted dataset will be:

$$W = \hat{W}_\gamma Y = \{g_1 y_1, g_2 y_2, \ldots, g_N y_N\}.$$

In other words, each data point $y_i$ of set Y is multiplied by the weighting function $g_i$ to get a weighted value for the data point.

The process of determining thresholds comprises finding the mean and variance (square of standard deviation) of the weighted data, according to embodiments. Generally, for time series data, the average is derived by the equation:

$$\bar{y} \equiv \frac{1}{N} \sum_{i=1}^{N} y_i$$

and the variance is derived by the equation:

$$S_y \equiv \frac{1}{N} \sum_{i=1}^{N} (y_i - \bar{y})^2.$$

However, when the data is weighted, determination of the average and variance must account for both the value of the data, as well as the weight of the data. According to embodiments, the following method is used to determine average and variance of weighted data where set W is the source of the weighted time series data. First, let average weight be defined as:

$$\bar{g} \equiv \sum_{i=1}^{N} g_i,$$

which is the sum of all the weight values.

Using the value of $\bar{g}$, the weighted average and weighted variance are determined using the following:

$$\bar{w} \equiv \frac{1}{\bar{g}} \sum_{i=1}^{N} (g_i y_i)$$

$$S_w \equiv \frac{1}{\bar{g}} \sum_{i=1}^{N} g_i (y_i - \bar{w})^2.$$

The above equations calculating $\bar{w}$ and $S_w$ account for the weight in determining the weighted average and weighted variance. The weighted standard deviation is the square root of the weighted variance.

The method disclosed above for the determining average and variance is but one method and can be substituted with other methods or equations. To show the functional equivalence of the variance of the weighted set, both the variance of unweighted and weighted data are expanded:

$$S_y = \frac{1}{N} \sum_{i=1}^{n} y_i^2 - \bar{y}^2$$

$$S_w = \frac{1}{\bar{g}} \sum_{i=1}^{n} w_i y_i - \bar{w}^2$$

According to embodiments, the upper and lower dynamic thresholds are determined as:

$$DT_U = \bar{w}_U + \zeta \sqrt{S_{w,U}}$$

$$DT_L = \bar{w}_L - \zeta \sqrt{S_{w,L}}$$

$$\zeta = 2.0 - 0.3338 * \ln(s) \; 0 < s < 1$$

where s is user specified sensitivity. Note that $\zeta$ is a curve fitted function with the boundary conditions:

$s \to 1 \; \zeta \to 2.$ $s \to 0.05 \; \zeta \to 3$

Many equations can be used for $\zeta$. In this case, the equation defining $\zeta$ was derived empirically based on the conditions for s and $\zeta$ described above and the curve desired. Artisans will readily be able to model other equations for $\zeta$ based on criteria determined on a case-by-case basis.

Thus, the upper threshold is defined as the mean of the weighted data set (weighted mean) plus a multiple (including fractions) of one or more weighted standard deviations above it. Artisans will readily recognize that the weighted standard deviation is the square root of the weighted variance. Note, $\bar{w}_U$ represents the weighted mean of only the upper α% of the time-series data on a per time unit and, if used, per cycle basis. Thus, the threshold is set as some number above the average of $\bar{w}_U$, not the entire range of weighted time series data.

According to embodiments, the system and method for generating and using dynamic thresholds is operational in an IT infrastructure or with numerous other general purpose or special purpose computing system environments or configurations. Examples of well known computing systems, environments, or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The systems and methods for determining generating and using dynamic thresholds may be described in the general context of computer-executable instructions, such as program modules, being executed by a computer. Generally, program modules include routines, programs, objects, components, data structures, etc. that perform particular tasks or implement particular abstract data types. The system may also be practiced in distributed computing environments where tasks are performed by remote processing devices that are linked through a communications network. In a distributed computing environment, program modules may be located in both local and remote computer storage media including memory storage devices. The computer programs are stored in a memory medium or storage medium or they may be provided to a processing unit through a network or I/O bus.

According to embodiments, the systems and methods of the present disclosure include at least one central processing unit (CPU) or processor. The CPU can be coupled to a memory, ROM, or computer readable media containing the computer-executable instructions for and generating and using dynamic thresholds. Computer readable media can be any available media that can be accessed by the system and includes both volatile and nonvolatile media, removable and non-removable media implemented in any method or technology for storage of information such as computer readable instructions, data structures, program modules or other data. Computer storage media includes, but is not limited to, RAM, ROM, EEPROM, flash memory, portable memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the dynamic threshold generation systems of the present disclosure.

Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of any of the above should also be included within the scope of computer readable media. The computer readable media may store instructions and/or data which implement all or part of the system described herein.

According to embodiments, the systems and methods of the present disclosure are incorporated within J2EE and NET based application that can be installed in any server environment, such a Windows or Linux server. In one aspect, the present system and method can act as an agentless system where no additional software is required to be installed on the monitored devices. Instead, the systems and methods may collect relevant data and perform various system availability and performance tests by sending messages to the monitored systems in the form of ICMP pings, TCP/IP messages, commands over SSH terminal sessions, via Windows Management Instrumentation (WMI) methods and other known communication methods with devices in an IT infrastructure.

Many of the embodiments described herein will be directed toward generating and using dynamic thresholds for applications in an IT infrastructure. However, it is the intention of the present inventor that the present system and generating and using dynamic thresholds can be extended to other types of systems and models.

While the methods and systems have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A non-transitory computer-readable storage medium having programming for executing a method comprising:
   dividing a set of time-series data into at least one time period;
   creating at least one set of ranged time-series data by selecting data points from each time period corresponding to a percentage of values useful in defining a threshold;
   applying cycles to the set of ranged time-series data;
   applying weights to the data for each cycle of ranged time-series data; and
   determining at least one threshold from the weighted time-series data;
   wherein the programming further executes the method such that an upper and a lower threshold is determined from the weighted time-series data;
   wherein the set of time-series data is divided into a plurality of time periods; and
   wherein a percentage of the highest values from each time period is aggregated and a percentage of the lowest values from each time period is aggregated to comprise an upper set of ranged time-series data and a lower set of ranged time-series data.

2. The non-transitory computer-readable storage medium of claim 1, wherein the programming further executes the method such that the time periods are selected from the group consisting of days, weeks, months, or years.

3. The non-transitory computer-readable storage medium of claim 1, wherein the programming further executes the method such that each threshold is a multiple of weighted standard deviations from the weighted mean.

4. A non-transitory computer-readable storage medium having programming for executing a method comprising:
   providing a system for determination of dynamic thresholds, wherein the system determines dynamic thresholds by:
   dividing a set of time-series data into a plurality of time periods;
   creating at least one set of ranged time-series data by selecting data points from each time period corresponding to a percentage of values useful in defining a threshold and aggregating the selected data points from more than one of the plurality of time periods;
   applying cycles to the set of ranged time-series data; and
   applying weights to the data for each cycle of ranged time-series data;
   determining at least one threshold from the weighted time-series data;
   wherein the programming further executes the method such that an upper and a lower threshold is determined from the weighted time-series data; and
   wherein a percentage of the highest values from each time period is aggregated and a percentage of the lowest values from each time period is aggregated to comprise an upper set of ranged time-series data and a lower set of ranged time-series data.

5. The non-transitory computer-readable storage medium of claim 4, wherein the programming further executes the method such that each threshold is a multiple of weighted standard deviations from the weighted mean.

6. A non-transitory machine-readable medium having program instructions stored thereon executable by a processing unit for performing the steps of:
   dividing a set of time-series data into a plurality of time periods;
   after dividing the set of time-series, creating at least one set of ranged time-series data by selecting data points from individual time periods corresponding to a percentage of values useful in defining a threshold, including forming each set of ranged time-series data by combining the selected data points within the same percentage of values of more than one of the time periods;
   after creating the at least one set of ranged time-series data, applying cycles to each of the sets of ranged time-series data;
   after applying the cycles, applying weights to the data for each cycle of ranged time-series data; and
   determining at least one threshold from the weighted time-series data;
   wherein an upper and a lower threshold is determined from the weighted time-series data; and
   wherein a percentage of the highest values from each time period and a percentage of the lowest values from each time period comprise an upper set of ranged time-series data and a lower set of ranged time-series data.

7. The non-transitory machine-readable medium of claim 6, wherein each threshold is a multiple of weighted standard deviations from the weighted mean.

* * * * *